US012732957B2

(12) United States Patent
Wang et al.

(10) Patent No.: US 12,732,957 B2
(45) Date of Patent: Sep. 8, 2026

(54) PAGING DETECTION METHOD AND APPARATUS, PAGING PROCESSING METHOD AND APPARATUS, AND COMMUNICATION DEVICE

(71) Applicant: VIVO MOBILE COMMUNICATION CO., LTD., Dongguan (CN)

(72) Inventors: Yangyang Wang, Dongguan (CN); Wei Bao, Dongguan (CN); Li Chen, Dongguan (CN); Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 322 days.

(21) Appl. No.: 18/386,250

(22) Filed: Nov. 1, 2023

(65) Prior Publication Data

US 2024/0064701 A1 Feb. 22, 2024

Related U.S. Application Data

(63) Continuation of application No. PCT/CN2022/090959, filed on May 5, 2022.

(30) Foreign Application Priority Data

May 8, 2021 (CN) ........................ 202110501161.9

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC .............................. H04W 68/02; H04W 76/28
(Continued)

(56) References Cited

U.S. PATENT DOCUMENTS

2013/0182626 A1* 7/2013 Kuo ...................... H04W 52/02 370/311
2019/0174571 A1* 6/2019 Deenoo ................ H04W 76/27
(Continued)

FOREIGN PATENT DOCUMENTS

CN 108924913 A 11/2018
WO 2021062610 A1 4/2021

OTHER PUBLICATIONS

International Search Report issued in corresponding International Application No. PCT/CN2022/090959, mailed Jun. 29, 2022, 4 pages.

(Continued)

*Primary Examiner* — Mark G. Pannell
(74) *Attorney, Agent, or Firm* — IPX PLLC

(57) ABSTRACT

This application discloses a paging detection method and apparatus. The method includes: monitoring paging in a first monitoring manner when a terminal is in an RRC inactive state. The first monitoring manner includes at least one of the following: monitoring radio access network paging on a first paging monitoring occasion, and monitoring core network paging on a second paging monitoring occasion; determining a third paging monitoring occasion, monitoring radio access network paging and core network paging on the third paging monitoring occasion; monitoring radio access network paging and core network paging on a fourth paging monitoring occasion; or monitoring radio access network paging and core network paging on a fifth paging monitoring occasion.

6 Claims, 13 Drawing Sheets

(58) Field of Classification Search
USPC .......................................................... 455/458
See application file for complete search history.

(56) References Cited

U.S. PATENT DOCUMENTS

| | | | | |
|---|---|---|---|---|
| 2019/0373577 | A1* | 12/2019 | Agiwal | H04W 48/12 |
| 2020/0053670 | A1* | 2/2020 | Jung | H04W 56/0015 |
| 2020/0084747 | A1* | 3/2020 | Hong | H04W 72/23 |
| 2020/0314949 | A1* | 10/2020 | Jung | H04W 68/00 |
| 2021/0112495 | A1* | 4/2021 | Liang | H04W 68/005 |
| 2022/0225273 | A1* | 7/2022 | Geng | H04W 76/28 |
| 2023/0319784 | A1* | 10/2023 | Hu | H04W 68/02 |
| 2023/0337184 | A1* | 10/2023 | Li | H04W 76/28 |
| 2025/0008485 | A1* | 1/2025 | Li | H04W 24/08 |

OTHER PUBLICATIONS

OPPO, “Discussion on eDRX for RedCap UEs”, 3GPP TSG-RAN WG2 Meeting #113bis electronic R2-2102736, Apr. 2021, 3 pages.
Intel Corporation, “Summary of offline 101—[Redcap] eDRX cycles—second round”, 3GPP TSG RAN WG2 Meeting #113bis-e R2-210xxxx, Apr. 2021, 17 pages.
Intel Corporation, “Remaining issues in RRC inactive state”, 3GPP TSG RAN WG2 Meeting #107 R2-1909549, Aug. 2019, 4 pages.

* cited by examiner 1200
1201
Paging processing apparatus
First execution module 1300
1301
1302
Paging processing apparatus
Sixth transceiver module
Seventh transceiver module

PAGING DETECTION METHOD AND APPARATUS, PAGING PROCESSING METHOD AND APPARATUS, AND COMMUNICATION DEVICE

CROSS-REFERENCE TO RELATED APPLICATIONS

This application is a continuation of International Application No. PCT/CN2022/090959, filed May 5, 2022, which claims priority to Chinese Patent Application No. 202110501161.9, filed May 8, 2021. The entire contents of each of the above-referenced applications are expressly incorporated herein by reference.

TECHNICAL FIELD

This application relates to the field of communication technologies, and in particular, to a paging detection method and apparatus, a paging processing method and apparatus, and a communication device.

BACKGROUND

In the related art, a user equipment (UE) in an inactive state of radio resource control (RRC) monitors paging initiated by a radio access network (RAN) and paging initiated by a core network (CN), and only monitors one paging occasion in a discontinuous reception (DRX) cycle. In some cases, for some UEs, paging initiated by a CN and paging initiated by a RAN are not overlapped, so that a UE in an RRC_INACTIVE state cannot monitor the paging initiated by the CN.

SUMMARY

Embodiments of this application provide a paging detection method and apparatus, a paging processing method and apparatus, and a communication device.

According to a first aspect, a paging detection method is provided, including:

monitoring, by a terminal, paging in a first monitoring manner if the terminal is in a radio resource control RRC inactive state, where the first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; and monitoring radio access network paging and core network paging on a fifth paging monitoring occasion, where the fifth paging monitoring occasion is determined by the radio access network device based on the minimum value in the second DRX cycle and the third DRX cycle, where the first DRX cycle is a paging DRX cycle configured by a radio access network, the second DRX cycle is a paging DRX cycle configured by a core network, and the third DRX cycle is a default DRX cycle broadcast in system information.

According to a second aspect, a paging processing method is provided, including:

determining, by a radio access network device, a fifth paging monitoring occasion based on a minimum value in a second DRX cycle and a third DRX cycle, where the fifth paging monitoring occasion is a monitoring occasion on which a terminal in an RRC inactive state monitors radio access network paging and monitor core network paging, where the second DRX cycle is a paging DRX cycle configured by a core network, and the third DRX cycle is a default DRX cycle broadcast in system information.

According to a third aspect, a paging processing method is provided, including:

receiving, by a core network device, second indication information from a terminal, where the second indication information indicates that the terminal supports monitoring paging in a first monitoring manner in a radio resource control RRC inactive state;

sending, by the core network device, the second indication information to a radio access network device, where the first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle, where the first DRX cycle is a paging DRX cycle configured by a radio access network, the second DRX cycle is a paging DRX cycle configured by a core network, and the third DRX cycle is a default DRX cycle broadcast in system information.

According to a fourth aspect, a paging detection apparatus is provided, including:

a first monitoring module, configured for a terminal to monitor paging in a first monitoring manner if the terminal is in a radio resource control RRC inactive state, where the first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle, where the first DRX cycle is a paging DRX cycle configured by a radio access network, the second DRX cycle is a paging DRX cycle configured by a core network, and the third DRX cycle is a default DRX cycle broadcast in system information.

According to a fifth aspect, a paging processing apparatus is provided, including:

a first execution module, configured to determine a fifth paging monitoring occasion based on a minimum value in a second DRX cycle and a third DRX cycle, where the fifth paging monitoring occasion is a monitoring occasion on which a terminal in an RRC inactive state monitors radio access network paging and core network paging, where the second DRX cycle is a paging DRX cycle configured by a core network, and the third DRX cycle is a default DRX cycle broadcast in system information.

According to a sixth aspect, a paging processing apparatus is provided, including:

a sixth transceiver module, configured to receive second indication information from a terminal, where the second indication information indicates that the terminal monitors paging in a first monitoring manner in a radio resource control RRC inactive state; and a seventh transceiver module, configured to send the second indication information to a radio access network device, where the first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle, where the first DRX cycle is a paging DRX cycle configured by a radio access network, the second DRX cycle is a paging DRX cycle configured by a core network, and the third DRX cycle is a default DRX cycle broadcast in system information.

According to a seventh aspect, a terminal is provided. The terminal includes a processor, a memory, and a program or instructions stored in the memory and executable on the processor. When the program or instructions are executed by the processor, the steps of the method according to the first aspect are implemented.

According to an eighth aspect, a terminal is provided, including a processor and a communication interface. The processor is configured to monitor paging in a first monitoring manner, if the terminal is in a radio resource control RRC inactive state.

the first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle, where the first DRX cycle is a paging DRX cycle configured by a radio access network, the second DRX cycle is a paging DRX cycle configured by a core network, and the third DRX cycle is a default DRX cycle broadcast in system information.

According to a ninth aspect, a network side device is provided. The network side device includes a processor, a memory, and a program or instructions stored in the memory and executable on the processor. When the program or instructions are executed by the processor, the steps of the method according to the second aspect or the third aspect are implemented.

According to a tenth aspect, a network side device is provided, including a processor and a communication interface. The processor is configured to determine a fifth paging monitoring occasion based on a minimum value in a second DRX cycle and a third DRX cycle, where the fifth paging monitoring occasion is a monitoring occasion on which a terminal in an RRC inactive state monitors radio access network paging and core network paging. The second DRX cycle is a paging DRX cycle configured by a core network, and the third DRX cycle is a default DRX cycle broadcast in system.

In some embodiments, the processor is configured to receive second indication information from the terminal, where the second indication information indicates that the terminal supports monitoring paging in a first monitoring manner in the radio resource control RRC inactive state; and send the second indication information to a radio access network device.

The first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle, where the first DRX cycle is a paging DRX cycle configured by a radio access network, the second DRX cycle is a paging DRX cycle configured by a core network, and the third DRX cycle is a default DRX cycle broadcast in system information.

According to an eleventh aspect, a readable storage medium is provided. The readable storage medium stores a program or instructions. When the program or instructions are executed, the steps of the method according to the first aspect are implemented, or the steps of the method according to the second aspect are implemented, or the steps of the method according to the third aspect are implemented.

According to a twelfth aspect, a chip is provided. The chip includes a processor and a communication interface. The communication interface is coupled to the processor. The processor is configured to run a program or instructions, to implement the method according to the first aspect, or implement the method according to the second aspect, or implement the method according to the third aspect.

According to a thirteenth aspect, a computer program product is provided. The computer program product is stored in a non-transitory storage medium. The computer program product is executed by at least one processor to implement the steps of the method according to the first aspect, the second aspect, or the third aspect.

According to a fourteenth aspect, a communication device is provided, and is configured to perform execution to implement the steps of the method according to the first aspect, the second aspect, or the third aspect.

In the embodiments of this application, the terminal in the RRC inactive state monitors paging in the first monitoring manner, for example, monitors radio access network paging on the first paging monitoring occasion and monitors core network paging on the second paging monitoring occasion; or monitors radio access network paging and core network paging on the third paging monitoring occasion, the fourth paging monitoring occasion, or the fifth paging monitoring occasion. In this way, it can be ensured that the terminal in the RRC inactive state can monitor both radio access network paging and the core network paging.

DETAILED DESCRIPTION

The following clearly describes the technical solutions in embodiments of this application with reference to the accompanying drawings in the embodiments of this application. Apparently, described embodiments are some of the embodiments of this application rather than all of the embodiments. All other embodiments obtained by a person of ordinary skill in the art based on the embodiments of this application shall fall within the protection scope of this application.

Terms "first" and "second" in the specification and claims of this application are used to distinguish similar objects, but are not used to describe a specific sequence or order. It may be understood that the terms used in such a way is interchangeable in proper circumstances, so that the embodiments of this application can be implemented in other sequences than the sequence illustrated or described herein. Objects distinguished by the terms "first" and "second" are usually of a type, and a number of the objects are not limited. For example, a first object may be one or more. In addition, "and/or" in the specification and claims represents at least one of the connected objects. The character "/" generally represents an "or" relationship between related objects.

It should be noted that technologies described in the embodiments of this application are not limited to a Long Term Evolution (LTE)/LTE-advanced (LTE-A) system, and are applicable to other wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. Terms "system" and "network" are usually be used interchangeably, and the technology described can be applied to the systems and radio technologies mentioned above, and can also be applied to other systems and radio technologies. A New Radio (NR) system is described in the following descriptions for illustration, and NR terms are used in most of the following descriptions, and these technologies may be used in application other than NR system application, for example, 6th generation (6G) communication system.

Figure 1:
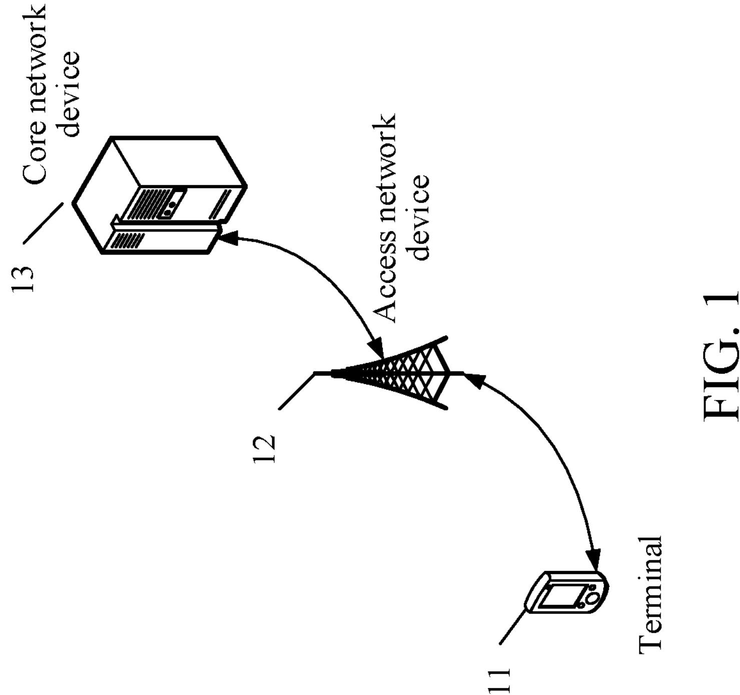
FIG. 1 is a structural diagram of a communication system to which an embodiment of this application is applicable.

FIG. 1 is a block diagram of a wireless communication system to which an embodiment of this application is applicable. The wireless communication system includes a terminal 11, an access network device 12, and a core network device 13. The terminal 11 may also be referred to as a terminal device or a user equipment (UE). The terminal 11 may be a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or a vehicle user equipment (VUE), a pedestrian user equipment (PUE), or another terminal side device. The wearable devices include: smartwatches, bands, headsets, glasses, and the like. It should be noted that, a specific type of the terminal 11 is not limited in this embodiment of this application. The access network device 12 may also be referred to as a radio access network device or a radio access network (RAN). The access network device 12 may be a base station. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another proper term in the art. The base station is not limited to a specific technological term, provided that a same technological effect is implemented. It should be noted that, in this embodiment of this application, the base station in the NR system is only used as an example, but a specific type of the base station is not limited. The core network device 13 may also be referred to as a core network (CN) or a 5G core (5GC) network. The core network device 13 may include, but is not limited to, at least one of the following: a core network node, a core network function, a Mobility Management Entity (MME), an Access Management Function (AMF), a Session Management Function (SMF), a User Plane Function (UPF), a Policy Control Function (PCF), a Policy and Charging Rules Function (PCRF), an Edge Application Server Discovery Function (EASDF), an Application Function (AF), a Network Data Analytics Function (NWDAF), or the like. It should be noted that, in this embodiment of this application, the core network device in a 5G system is only used as an example.

To make a person skilled in the art better understand this embodiment of this application, the following is first described.

A UE in an RRC idle state (RRC_IDLE) and a UE in an RRC inactive state (RRC_INACTIVE) both need to monitor paging on a paging occasion (PO), and the UE in the RRC_IDLE state monitors paging initiated by the CN in a paging channel; and the UE in the RRC_INACTIVE state further needs to monitor paging initiated by the RAN. For power saving, a paging DRX is introduced, so that the UE in the RRC_IDLE or the RRC_INACTIVE only needs to monitor paging on one PO in each DRX cycle. A paging DRX cycle is configured by a network.

For paging initiated by the CN, a default cycle is broadcast in system information;

- for paging initiated by the CN, Non-Access-Stratum (NAS) signaling is used to configure a specific cycle of the UE; and
- for paging initiated by the RAN, RRC signaling is used to configure a specific cycle of the UE.

The UE uses a shortest applicable DRX cycle, that is, the UE in the RRC_IDLE state uses a shorter cycle in the foregoing first two cycles, and the UE in the RRC_INACTIVE state uses a shortest cycle in the foregoing three cycles.

The paging initiated by the CN and the paging initiated by the RAN use a same UE identity document (ID) during calculation of POs, and therefore, POs may be overlapped. In a DRX cycle, different quantities of POs can be configured through the system information, and are distributed on different POs by the network based on UE IDs of UEs.

It should be noted that, when UE context is lost on a RAN side, core network paging is sent to a terminal in an RRC inactive state, that is, a network side considers that the terminal is in an RRC idle state, and the terminal considers that the terminal is in an RRC active state. In this case, based on a method for calculating PO in a current protocol, when a paging cycle of RRC signaling configuration is shorter than a paging cycle configured by the CN and a default paging cycle, for some UEs, it is detected that the PO on which the paging initiated by the CN does not overlap with the PO on which the paging initiated by the RAN (the network side uses the shorter cycle in the foregoing first two paging cycles to determine the PO, the terminal uses the shortest cycle in the foregoing three cycles to determine the PO, and therefore, the DRX cycle of the paging initiated by the CN and the DRX cycle of the paging initiated by the RAN that are calculated and detected may be different), so that the UE in the RRC_INACTIVE state cannot always monitor the paging initiated by the CN, causing a paging delay.

A paging detection method and a paging processing method provided in the embodiments of this application are described in detail by using some embodiments and application scenarios thereof with reference to the accompanying drawings.

Figure 2:
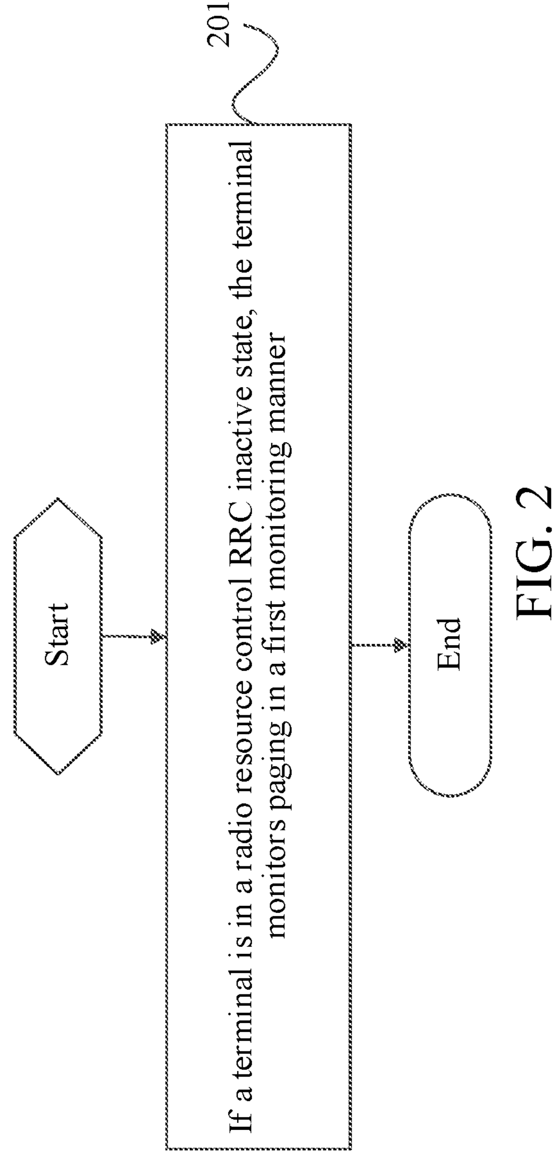
FIG. 2 is a flowchart 1 of a paging detection method according to an embodiment of this application.

As shown in FIG. 2, an embodiment of this application provides a paging detection method, including the following steps.

Step 201: If a terminal is in a radio resource control RRC inactive state, the terminal monitors paging in a first monitoring manner.

The first monitoring manner includes at least one of the following:

- first item: monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;
- second item: determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion; that is, the terminal adjusts a position of the first paging monitoring occasion based on the preset adjustment mode, so that the first paging monitoring occasion overlaps with the second paging monitoring occasion, and determines the adjusted first paging monitoring occasion as the third paging monitoring occasion;
- third item: monitoring radio access network paging and core network paging on a fourth paging monitoring occasion, where the fourth paging monitoring occasion is determined by the core network device based on the minimum value in the first DRX cycle, the second DRX cycle, and the third DRX cycle; or
- fourth item: monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network (for example, a UE specific cycle configured by RRC signaling), the second DRX cycle is a paging DRX cycle configured by a core network (for example, a UE specific cycle configured by NAS signaling), and the third DRX cycle is a default DRX cycle broadcast in system information (for example, a default paging cycle broadcast in the system information).

In this embodiment of this application, a capability of monitoring paging by the terminal in the radio resource control RRC inactive state in the first monitoring manner may be referred to as a first capability. The first capability may be notified by the core network device to the radio access network device. In some embodiments, the terminal sends second indication information to the core network device, where the second indication information indicates that the terminal supports monitoring paging in the first monitoring manner in the RRC inactive state, that is, indicates that the terminal has the first capability. After receiving the second indication information, the core network device sends the second indication information to the radio access network device. In some embodiments, the core network device may be an Access and Mobility Management Function (AMF), and the radio access network device may be a base station. The first capability may be notified by the AMF to the base station, and the base station configure the RAN DRX cycle based on the first capability of the UE. In addition, during handover by a UE, a source base station notifies a target base station of the first capability of the UE. In some embodiments, the source base station sends the second indication information to the target base station.

In some embodiments, when the terminal does not support or does not have the first capability, the terminal may monitor paging based on at least one of the first item, the second item, the third item, or the fourth item.

The first monitoring manner is described in detail below.

In some embodiments, for the first item, in a DRX cycle, there are the first paging monitoring occasion and the second paging monitoring occasion at the same time, and the two paging monitoring occasions are not completely overlapped. The terminal in the RRC active state can monitor radio access network paging on the first paging monitoring occasion, and monitor core network paging on the second paging monitoring occasion, to ensure that the terminal can both monitor radio access network paging and core network paging.

For the second item, the terminal in the RRC active state can determine the third paging monitoring occasion, and monitor radio access network paging and core network paging on the third paging monitoring occasion. In an overlapped paging frame, the third paging monitoring occasion overlaps with the second paging monitoring occasion. In other words, an occasion of monitoring the paging initiated by the core network and an occasion of monitoring the paging initiated by the radio access network are overlapped and both correspond to the third paging monitoring occasion, to ensure that the terminal can monitor both radio access network paging and core network paging on the third paging monitoring occasion.

For the third item, the terminal can obtain the fourth paging monitoring occasion indicated by the core network device, and monitor radio access network paging and core network paging on the fourth paging monitoring occasion. The fourth paging monitoring occasion is determined by the core network device based on the minimum value in the first DRX cycle, the second DRX cycle, and the third DRX cycle, and the radio access network device determines the paging monitoring occasion corresponding to the RAN paging based on the minimum value in the first DRX cycle, the second DRX cycle, and the third DRX cycle, to ensure that the paging monitoring occasion corresponding to the core network paging and the paging monitoring occasion corresponding to the RAN are overlapped, and further ensure that the terminal can monitor both radio access network paging and core network paging on the fourth paging monitoring occasion.

For the fourth item, the terminal in the RRC inactive state can obtain the fifth paging monitoring occasion, and monitor radio access network paging and core network paging on the fifth paging monitoring occasion. The fifth paging monitoring occasion is determined by the radio access network device based on the minimum value in the second DRX cycle and the third DRX cycle, and the core network device originally determines the paging monitoring occasion corresponding to the core network paging based on the minimum value in the second DRX cycle and the third DRX cycle, to ensure that the paging monitoring occasion corresponding to the core network paging and the paging monitoring occasion corresponding to the RAN are overlapped, and further ensure that the terminal can monitor both radio access network paging and core network paging on the fifth paging monitoring occasion.

In this embodiment of this application, the terminal in the RRC inactive state monitors paging in the first monitoring manner, for example, monitors radio access network paging on the first paging monitoring occasion and monitors core network paging on the second paging monitoring occasion; or monitors radio access network paging and core network paging on the third paging monitoring occasion, the fourth paging monitoring occasion, or the fifth paging monitoring occasion. In this way, it can be ensured that the terminal in the RRC inactive state can monitor both radio access network paging and the core network paging.

In some embodiments, before the monitoring radio access network paging on a first paging monitoring occasion, and monitoring core network paging on a second paging monitoring occasion; or before the monitoring radio access network paging and core network paging on the third paging monitoring occasion, the method further includes:

receiving first indication information, where the first indication information indicates that a network supports or allows the terminal in the radio resource control RRC inactive state to monitor paging in the first monitoring manner.

In other words, in this embodiment of this application, after the terminal receives the first indication information, the terminal monitors paging based on the first item or the second item.

In some embodiments, the third paging monitoring occasion is determined based on the following formula:

$$i\_s=\text{floor}(\text{UE\_ID}/N1)\bmod Ns, \text{ where}$$

i_s represents an index of the third paging monitoring occasion, N1 represents a total number of paging frames in the first paging cycle, Ns represents a number of paging occasions in a paging frame, and UE_ID represents a terminal identity related to a terminal, and UE_ID=5G-S-TMSI mod 1024, where 5G-S-TMSI represents 5G-S-temporary mobile subscriber identity.

In some embodiments, before the terminal monitors radio access network paging and core network paging on the fourth paging monitoring occasion or the fifth paging monitoring occasion, the method further includes:

reporting first information, where the first information indicates that the first paging monitoring occasion does not completely overlap with the second paging monitoring occasion.

For example, if the terminal that is in the RRC inactive state and that has the first capability finds that the paging monitoring occasion does not overlap with the second paging monitoring occasion, the terminal reports the first information, and the network side gives corresponding response to the UE. The response may be: the network ignores the first information, or indicates a paging monitoring occasion to the terminal, such as the fourth paging monitoring occasion or the fifth paging monitoring occasion.

After the terminal reports the first information, the radio access network device may indicate the fifth paging monitoring occasion to the terminal based on the first information, or the radio access network device sends the first information and the first DRX cycle to the core network device, and the core network device determines the fourth paging monitoring occasion, and indicates the fourth paging monitoring occasion to the terminal.

In some embodiments, before the terminal monitors radio access network paging and core network paging on the fourth paging monitoring occasion or the fifth paging monitoring occasion, the method further includes:

obtaining a target paging monitoring occasion through broadcast indication information or dedicated signaling indication information, where the target paging monitoring occasion is the fourth paging monitoring occasion or the fifth paging monitoring occasion.

The terminal having the first capability can obtain the target paging monitoring occasion through the broadcast indication information or the dedicated signaling indication information, and the terminal monitors paging on the target paging monitoring occasion. The UE without the first capability may ignore the broadcast indication information and the dedicated signaling indication information.

For example, when the target paging monitoring occasion is indicated by using dedicated signaling, the UE that is in a connected state and that has the first capability reads and stores the dedicated signaling indication information when entering the RRC inactive state, and monitors paging on the target paging monitoring occasion based on the dedicated signaling indication information.

In this embodiment of this application, the terminal in the RRC inactive state monitors paging in the first monitoring manner, for example, monitors radio access network paging on the first paging monitoring occasion and monitors core network paging on the second paging monitoring occasion; or monitors radio access network paging and core network paging on the third paging monitoring occasion, the fourth paging monitoring occasion, or the fifth paging monitoring occasion. In this way, it can be ensured that the terminal in the RRC inactive state can monitor both radio access network paging and the core network paging.

Figure 3:
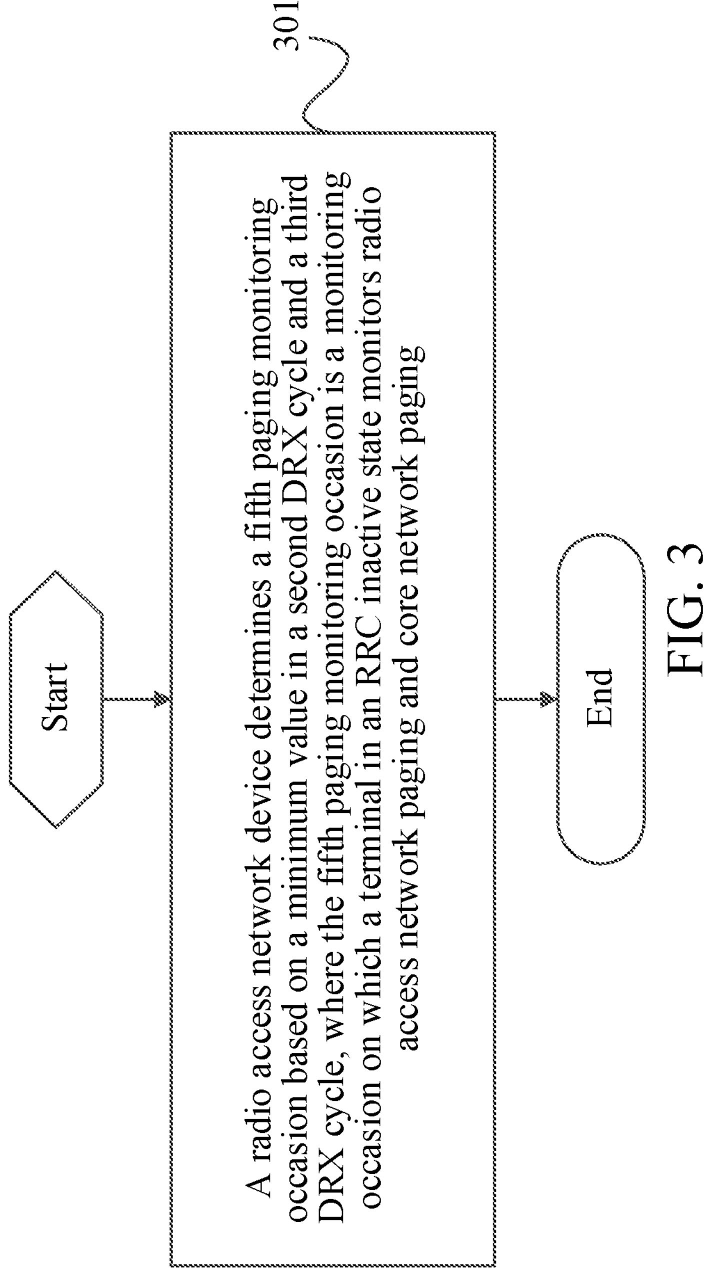
FIG. 3 is a flowchart 2 of a paging processing method according to an embodiment of this application.

As shown in FIG. 3, an embodiment of this application further provides a paging processing method, including:

Step 301: A radio access network device determines a fifth paging monitoring occasion based on a minimum value in a second DRX cycle and a third DRX cycle, where the fifth paging monitoring occasion is a monitoring occasion on which a terminal in an RRC inactive state monitors radio access network paging and monitor core network paging.

In other words, the first DRX cycle is set to be the same as the second DRX cycle, and/or the first DRX cycle is set to be the same as the third DRX cycle.

The second DRX cycle is a paging DRX cycle configured by a core network (for example, a UE specific cycle configured by NAS signaling), and the third DRX cycle is a default DRX cycle broadcast in system information (for example, a default paging cycle broadcast in system information).

The radio access network device may be a base station.

In this embodiment of this application, the fifth paging monitoring occasion is determined based on the minimum value in the second DRX cycle and the third DRX cycle. Because the core network device originally determines the paging monitoring occasion corresponding to core network paging based on the minimum value in the second DRX cycle and the third DRX cycle, it can be ensured that the paging monitoring occasion corresponding to core network paging overlaps with the paging monitoring occasion corresponding to the RAN, thereby further ensuring that the terminal can monitor both radio access network paging and core network paging on the fifth paging monitoring occasion.

In some embodiments, that a radio access network device determines a fifth paging monitoring occasion based on a minimum value in a second DRX cycle and a third DRX cycle includes:

the radio access network device receives second indication information from a core network device, where the second indication information indicates that the terminal supports monitoring paging in a first monitoring manner in the radio resource control RRC inactive state, and the first monitoring manner includes monitoring radio access network paging and core network paging on the fifth paging monitoring occasion.

In other words, the radio access network device can determine that the terminal has the first capability through the second indication information, and the radio access network device can configure a DRX cycle of the RAN based on the first capability of the terminal.

In some embodiments, that a radio access network device determines a fifth paging monitoring occasion based on a minimum value in a second DRX cycle and a third DRX cycle includes:

the radio access network device determines the fifth paging monitoring occasion based on a minimum value in the second DRX cycle and the third DRX cycle if a first paging monitoring occasion does not completely overlap with a second paging monitoring occasion in a discontinuous DRX cycle, where the first paging monitoring occasion is a monitoring occasion determined based on a minimum value in a first DRX cycle, the second DRX cycle, and the third DRX cycle, the second paging monitoring occasion is a monitoring occasion determined based on the minimum value in the second DRX cycle and the third DRX cycle, and the first DRX cycle is a paging DRX cycle configured by a radio access network.

In some embodiments, that the radio access network device determines the fifth paging monitoring occasion based on a minimum value in the second DRX cycle and the third DRX cycle if a first paging monitoring occasion does not completely overlap with a second paging monitoring occasion in a discontinuous DRX cycle includes:

the radio access network device determines the fifth paging monitoring occasion based on the minimum value in the second DRX cycle and the third DRX cycle if first information is received, where the first information indicates that the first paging monitoring occasion does not completely overlap with the second paging monitoring occasion.

In other words, the radio access network device determines that the first paging monitoring occasion does not completely overlap with the second paging monitoring occasion based on the first information sent by the terminal.

The method in this embodiment of this application further includes:

sending the first information to the core network device.

The method in this embodiment of this application further includes:

sending the first DRX cycle to the core network device.

In an implementation, the terminal reports the first information to the radio access network device and the core network device. After receiving the first information, the radio access network device reports the first DRX cycle to the core network device, and the core network device determines that an occasion of sending core network paging is the fourth paging monitoring occasion. In another implementation, the radio access network device receives the first information and reports the first DRX cycle in a wireless manner, that is, the radio access network device directly sends the first DRX cycle to the core network device, and the core network device determines that the occasion of sending core network paging is the fourth paging monitoring occasion.

The method in this embodiment of this application further includes:

indicating the fifth paging monitoring occasion to the terminal.

The indicating the fifth paging monitoring occasion to the terminal includes:

indicating the fifth paging monitoring occasion to the terminal through broadcast indication information or dedicated signaling indication information.

The fifth paging monitoring occasion is indicated to the terminal through the broadcast indication information or the dedicated signaling indication information, so that the terminal can monitor both radio access network paging and core network paging on the fifth paging monitoring occasion.

In some embodiments, the radio access network device is a source base station, and the method further includes:

sending second indication information to a target base station to which the terminal performs cell handover, where the second indication information indicates that the terminal supports monitoring paging in a first monitoring manner in the radio resource control RRC inactive state.

In other words, during the cell handover by the terminal, the source base station may notify the target base station of the first capability of the terminal through the second indication information.

In this embodiment of this application, the fifth paging monitoring occasion is determined based on the minimum value in the second DRX cycle and the third DRX cycle. Because the core network device originally determines the paging monitoring occasion corresponding to core network paging based on the minimum value in the second DRX cycle and the third DRX cycle, it can be ensured that the paging monitoring occasion corresponding to core network paging overlaps with the paging monitoring occasion corresponding to the RAN, thereby further ensuring that the terminal can monitor both radio access network paging and core network paging on the fifth paging monitoring occasion.

Figure 4:
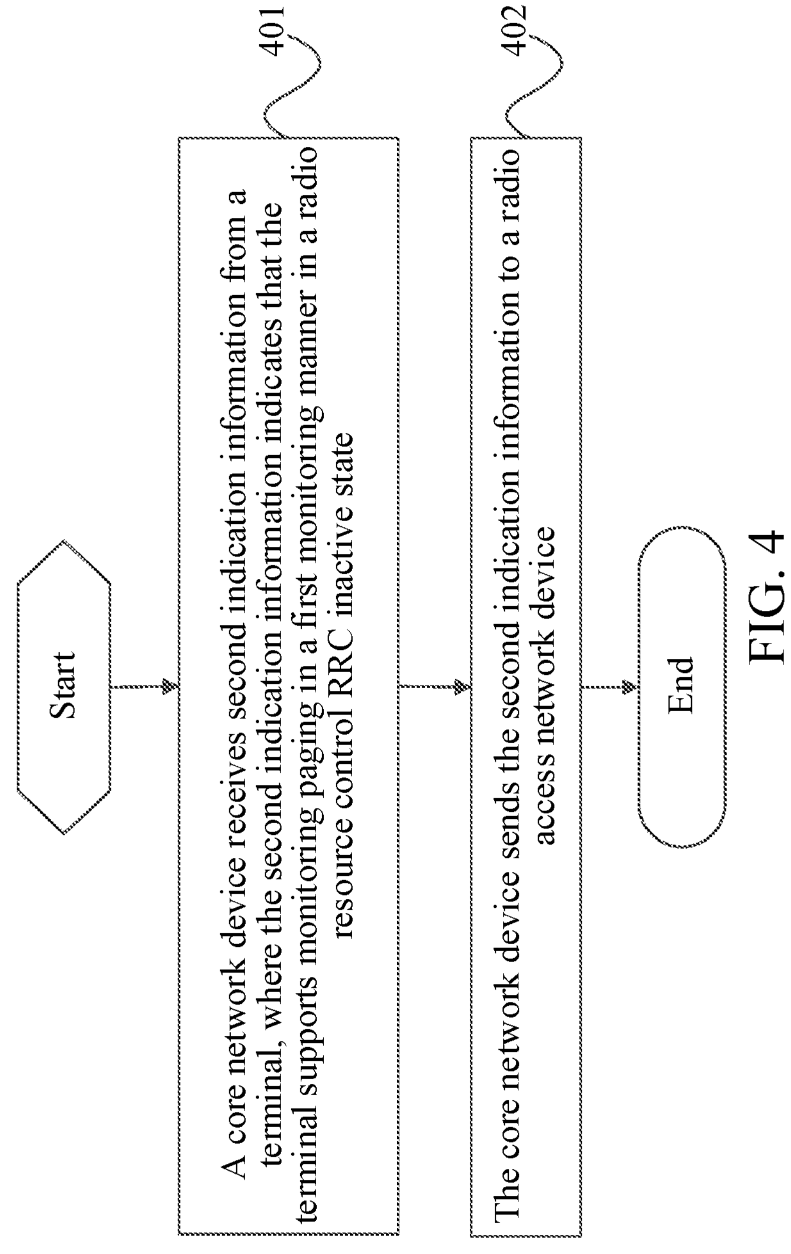
FIG. 4 is a flowchart 3 of a paging processing method according to an embodiment of this application.

As shown in FIG. 4, an embodiment of this application further provides a paging processing method, including:

Step 401: A core network device receives second indication information from a terminal, where the second indication information indicates that the terminal supports monitoring paging in a first monitoring manner in a radio resource control RRC inactive state.

Step 402: The core network device sends the second indication information to the radio access network device.

The first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network, the second DRX cycle is a paging DRX cycle configured by a core network, and the third DRX cycle is a default DRX cycle broadcast in system information.

In this embodiment of this application, a capability of monitoring paging by the terminal in the radio resource control RRC inactive state in the first monitoring manner may be referred to as a first capability. For the first capability, the terminal can notify the core network device through the second indication information. When receiving the second indication information sent by the terminal, the core network device sends the second indication information to the radio access network device, to notify the radio access network device of the first capability of the terminal. In some embodiments, the core network device may be an Access and Mobility Management Function (AMF), and the radio access network device may be a base station. The first capability may be notified by the AMF to the base station, and the base station configure the RAN DRX cycle based on the first capability of the UE.

The method according to this embodiment of this application is described below with reference to specific embodiments.

Embodiment 1

In this embodiment of this application, a new parameter N1 is introduced, and a Paging Frame (PF) and a Paging Occasion (PO) are calculated based on N1. A calculation method of the PF is the same as that of the existing protocol. A calculation method of a system frame number (SFN) of a radio frame in which the PF is located is: (SFN+PF_offset) mod T=(T div N)*(UE_ID mod N). A calculation method of an index of the PO is: i_s=floor (UE_ID/N1)mod Ns.

SFN represents the radio frame in which the PF is located, T represents the DRX cycle of the UE (if RRC or an upper layer configures a UE specific DRX cycle, T is determined by the UE specific DRX cycle and a default DRX cycle broadcast in system information. In an RRC_IDLE state, if the upper layer does not configure the UE specific DRX cycle, a default value is used). N represents a total number of paging frames in T, PF_offset is an offset value for calculating the PF, UE_ID represents a terminal identity related to a terminal identifier, N1 represents a total number of paging frames in the first paging cycle, Ns represents a number of paging occasions in a paging frame, and i_s represents a redetermined index of the third paging monitoring occasion.

For the UE in the RRC idle state, N1=N; and for the UE in the RRC inactive state, when N1 is determined by N and a paging frame offset (nAndPagingFrameOffset) parameter, the first paging cycle corresponds to a minimum value in the paging cycle broadcast in the system information and the UE specific DRX cycle allocated by the NAS signaling (if configured), that is min{default paging cycle, UE-specific DRX value configured by NAS signaling (if configured)}. In some embodiments, N1=N*first paging cycle/T.

The UE that is in the RRC_IDLE and/or RRC_INACTIVE state and that has the first capability monitors paging based on the formula.

It is assumed that the default paging cycle broadcast in the system information (default paging cycle broadcast in system information)=256 radio frames;

- the UE specific cycle configured by the NAS signaling (UE specific cycle configured by NAS signaling)=64 radio frames;
- the UE specific cycle configured by the RRC signaling (UE specific cycle configured by RRC signaling)=32 radio frames;

nAndPagingFrameOffset is configured as {one T, 0}; and ns is configured as {two}.

Figure 5:
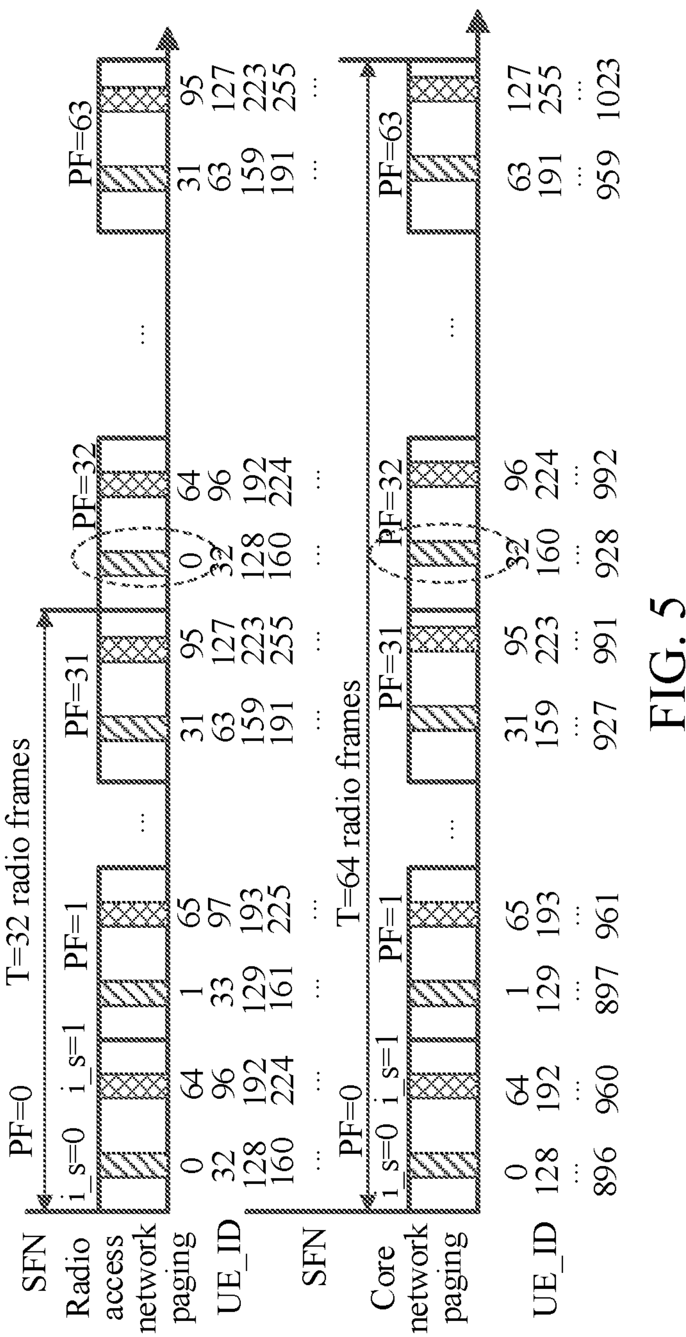
FIG. 5 is a schematic diagram 1 of positions of a PO corresponding to CN paging and a PO corresponding to RAN paging.

Based on the formulas, as shown in FIG. 5, the PO of the paging initiated by the CN and the PO of the paging initiated by the RAN monitored by the UE in the RRC_INACTIVE state are the same.

Embodiment 2: Network Implementation

An implementation of the network implementation described herein is:

- the UE in the RRC_INACTIVE state reports the paging cycle configured by the RAN to the core network; and
- the paging initiated by the CN is sent based on a minimum value in the default paging cycle, the paging cycle configured by the RAN, and the cycle configured by the CN (if configured). UE in the RRC_INACTIVE state detects CN paging and RAN paging at a position of the PO based on the following formula.

A calculation method of an SFN in which the PF is located is:

$$(SFN+PF\_offset) \bmod T=(T \text{ div } N)*(UE\_ID \bmod N).$$

A calculation method of an index of the PO is: i_s=floor (UE_ID/N)mod Ns.

T is a shorter value in the UE specific cycle configured by the NAS signaling or the RRC signaling (if configured) and the default cycle broadcast in system information.

It is assumed that the default paging cycle in the system information=256 radio frames;

- the UE specific cycle configured by the NAS signaling=64 radio frames;
- the UE specific cycle configured by the RRC signaling=32 radio frames;

nAndPagingFrameOffset is configured as {one T, 0}; and ns is configured as {two}.

Figure 6:
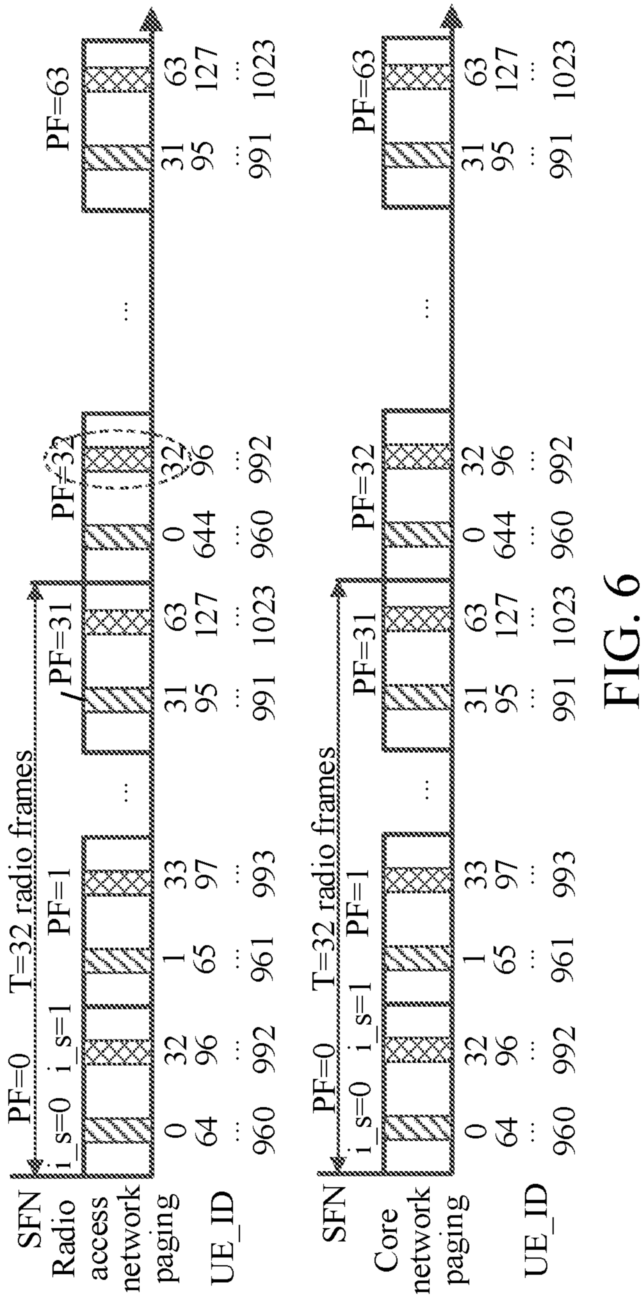
FIG. 6 is a schematic diagram 2 of positions of a PO corresponding to CN paging and a PO corresponding to RAN paging.

The POs corresponding to the paging initiated by the CN and the paging initiated by the RAN are as shown in FIG. 6.

Embodiment 3: In the RRC_INACTIVE state, if the POs corresponding to the CN paging and the RAN paging are not overlapped, the UE detects two POs in one DRX cycle.

When paging frames of the UE in the RRC_INACTIVE state corresponding to the paging initiated by the CN and the paging initiated by the RAN are overlapped but the POs are not overlapped, the UE having a second capability monitors two POs in the DRX cycle corresponding to the two overlapped paging frames. The second capability is: the UE can monitor two POs in a DRX cycle.

Figure 7:
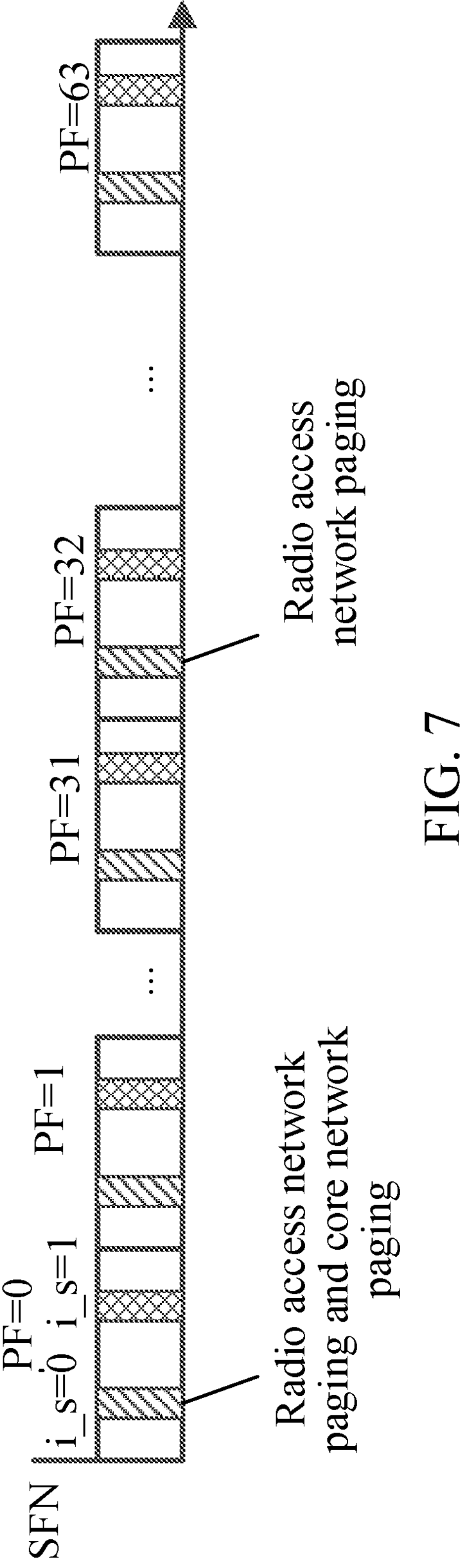
FIG. 7 is a schematic diagram 3 of positions of a PO corresponding to CN paging and a PO corresponding to RAN paging.

Parameter setting is the same as the parameter setting in the Embodiment 1, as shown in FIG. 7, for a UE whose UE_ID=0, when the PF corresponding to the paging initiated by the CN is 0, the index of the PO is 0. When the PF corresponding to the paging initiated by the RAN is 0, the index of the PO is also 0. In this case, the UE only needs to monitor one PO in a DRX cycle.

Figures 8, 9:
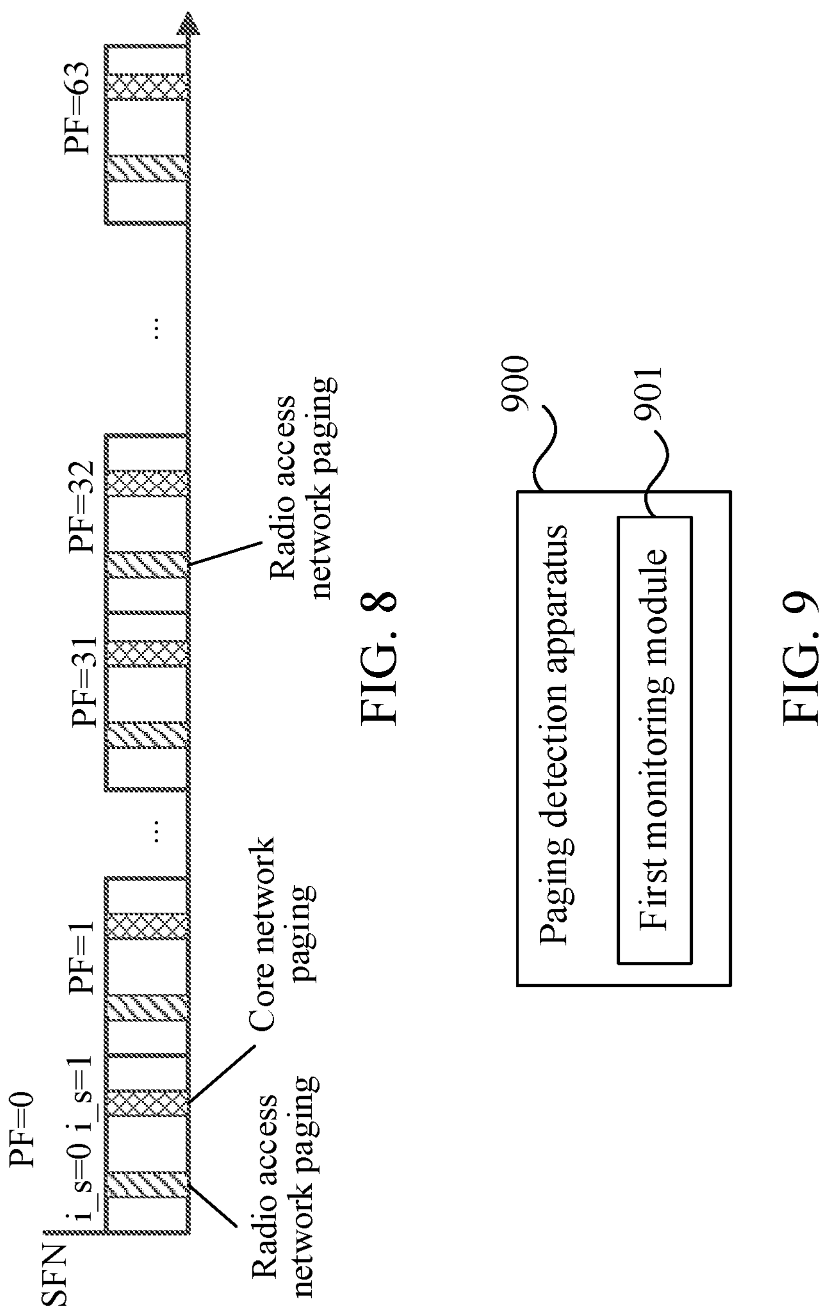
FIG. 8 is a schematic diagram 4 of positions of a PO corresponding to CN paging and a PO corresponding to RAN paging.
FIG. 9 is a schematic diagram of a module of a paging detection apparatus according to an embodiment of this application.

As shown in FIG. 8, for a UE whose UE_ID=64, the PF corresponding to the paging initiated by the CN is 0, the index of the PO is 1. When the PF corresponding to the paging initiated by the RAN is 0, the index of the PO is 0. In this case, the UE needs to monitor two POs in the DRX cycle.

In this embodiment of this application, the UE in the RRC_INACTIVE state can monitor the paging initiated by the RAN and the paging initiated by the CN, avoiding a paging delay.

It should be noted that, the paging detection method provided in this embodiment of this application may be performed by a paging detection apparatus, or a control module for performing the paging detection method in the paging detection apparatus. An example in which a paging detection apparatus performs the paging detection method is used in this embodiment of this application to describe the paging detection apparatus provided in this embodiment of this application.

As shown in FIG. 9, an embodiment of this application provides a paging detection apparatus 900, including:

a first monitoring module 901, configured for a terminal to monitor paging in a first monitoring manner if the terminal is in a radio resource control RRC inactive state.

The first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; and monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network, the second DRX cycle is a paging DRX cycle configured by a core network, and the third DRX cycle is a default DRX cycle broadcast in system information.

The apparatus in this embodiment of this application further includes:

a second determining module, configured to determine the first monitoring manner.

The apparatus in this embodiment of this application further includes:

a first transceiver module, configured to receive, before the first monitoring module monitors radio access network paging on the first paging monitoring occasion and monitors core network paging on the second paging monitoring occasion, or before the first monitoring module monitors radio access network paging and core network paging on the third paging monitoring occasion, first indication information, where the first indication information indicates that a network supports or allows the terminal, in the radio resource control RRC inactive state, to monitor paging in the first monitoring manner.

In some embodiments, the first monitoring module is configured to determine the third paging monitoring occasion based on the following formula:

$$i\_s = \text{floor}(\text{UE\_ID}/N1) \bmod Ns,$$ where i_s represents an index of the third paging monitoring occasion, N1 represents a total number of paging frames in the first paging cycle, Ns represents a number of paging occasions in a paging frame, and UE_ID represents a terminal identity related to a terminal identifier.

The apparatus in this embodiment of this application further includes:

a first reporting module, configured to report, before the first monitoring module monitors radio access network paging and core network paging on the fourth paging monitoring occasion or the fifth paging monitoring occasion, first information, where the first information indicates that the first paging monitoring occasion does not completely overlap with the second paging monitoring occasion.

The apparatus in this embodiment of this application further includes:

a first obtaining module, configured to obtain, before the first monitoring module monitors radio access network paging and core network paging on the fourth paging monitoring occasion or the fifth paging monitoring occasion, a target paging monitoring occasion through broadcast indication information or dedicated signaling indication information, where the target paging monitoring occasion is the fourth paging monitoring occasion or the fifth paging monitoring occasion.

The apparatus in this embodiment of this application further includes:

a second transceiver module, configured to send second indication information to the core network device, where the second indication information indicates that the terminal supports monitoring paging in the first monitoring manner in the radio resource control RRC inactive state.

In this embodiment of this application, the terminal in the RRC inactive state monitors paging in the first monitoring manner, for example, monitors radio access network paging on the first paging monitoring occasion and monitors core network paging on the second paging monitoring occasion; or monitors radio access network paging and core network paging on the third paging monitoring occasion, the fourth paging monitoring occasion, or the fifth paging monitoring occasion. In this way, it can be ensured that the terminal in the RRC inactive state can monitor both radio access network paging and the core network paging.

The paging detection apparatus in this embodiment of this application may be an apparatus, or an apparatus or electronic device with an operating system, or may be a component, an integrated circuit, or a chip in a terminal. The apparatus or the electronic device may be a mobile terminal, or may be a non-mobile terminal. For example, the mobile terminal may include, but is not limited to, type of the terminal 11 listed above, and the non-mobile terminal may be a server, a network attached storage (NAS), a personal computer (PC), a television (TV), a teller machine, a self-service machine, or the like. This is not limited in this embodiment of this application.

The apparatus provided in this embodiment of this application can implement all processes implemented in the method embodiment in FIG. 2 and has a same technical effect. To avoid repetition, details are not described herein again.

Figure 10:
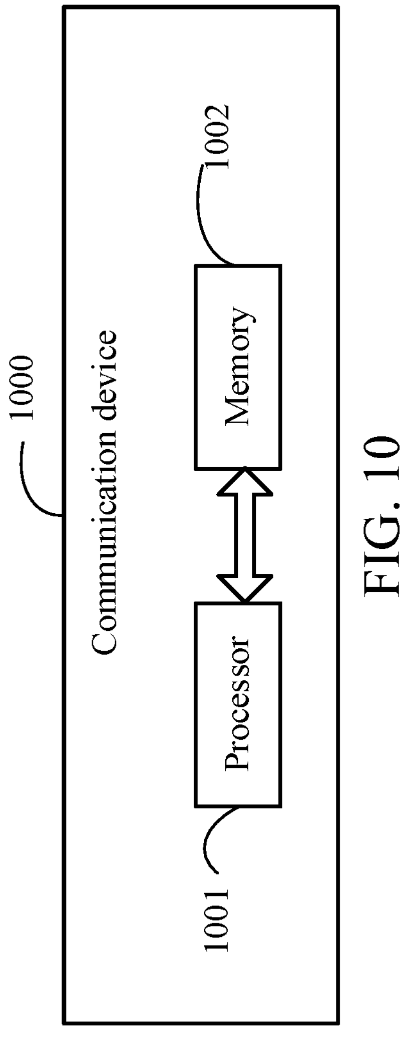
FIG. 10 is a structural block diagram of a communication device according to an embodiment of this application.

As shown in FIG. 10, an embodiment of this application further provides a communication device 1000, including a processor 1001, a memory 1002, and a program or instructions stored in the memory 1002 and executable on the processor 1001. For example, when the communication device 1000 is a terminal, the program or instructions are executed by the processor 1001 to implement the processes of the foregoing paging detection method embodiments applicable to the terminal, and can achieve a same technical effect. When the communication device 1000 is a network side device (radio access network), the program or instructions are executed by the processor 1001 to implement the processes of the foregoing paging processing method embodiments applicable to a radio access network side, and can achieve a same technical effect. When the communication device 1000 is a network side device, the program or instructions are executed by the processor 1001 to implement the processes of the foregoing paging processing method embodiments applicable to a core network device side, and can achieve a same technical effect. To avoid repetition, details are not described herein again.

An embodiment of this application further provides a terminal, including a processor and a communication interface. The processor is configured to: monitor paging in a first monitoring manner if the terminal is in a radio resource control RRC inactive state.

The first monitoring manner includes at least one of the following:

- monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;
- determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;
- monitoring radio access network paging and core network paging on a fourth paging monitoring occasion, where the fourth paging monitoring occasion is determined by the core network device based on the minimum value in the first DRX cycle, the second DRX cycle, and the third DRX cycle; or
- monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network, the second DRX cycle is a paging DRX cycle configured by a core network, and the third DRX cycle is a default DRX cycle broadcast in system information.

Figure 11:
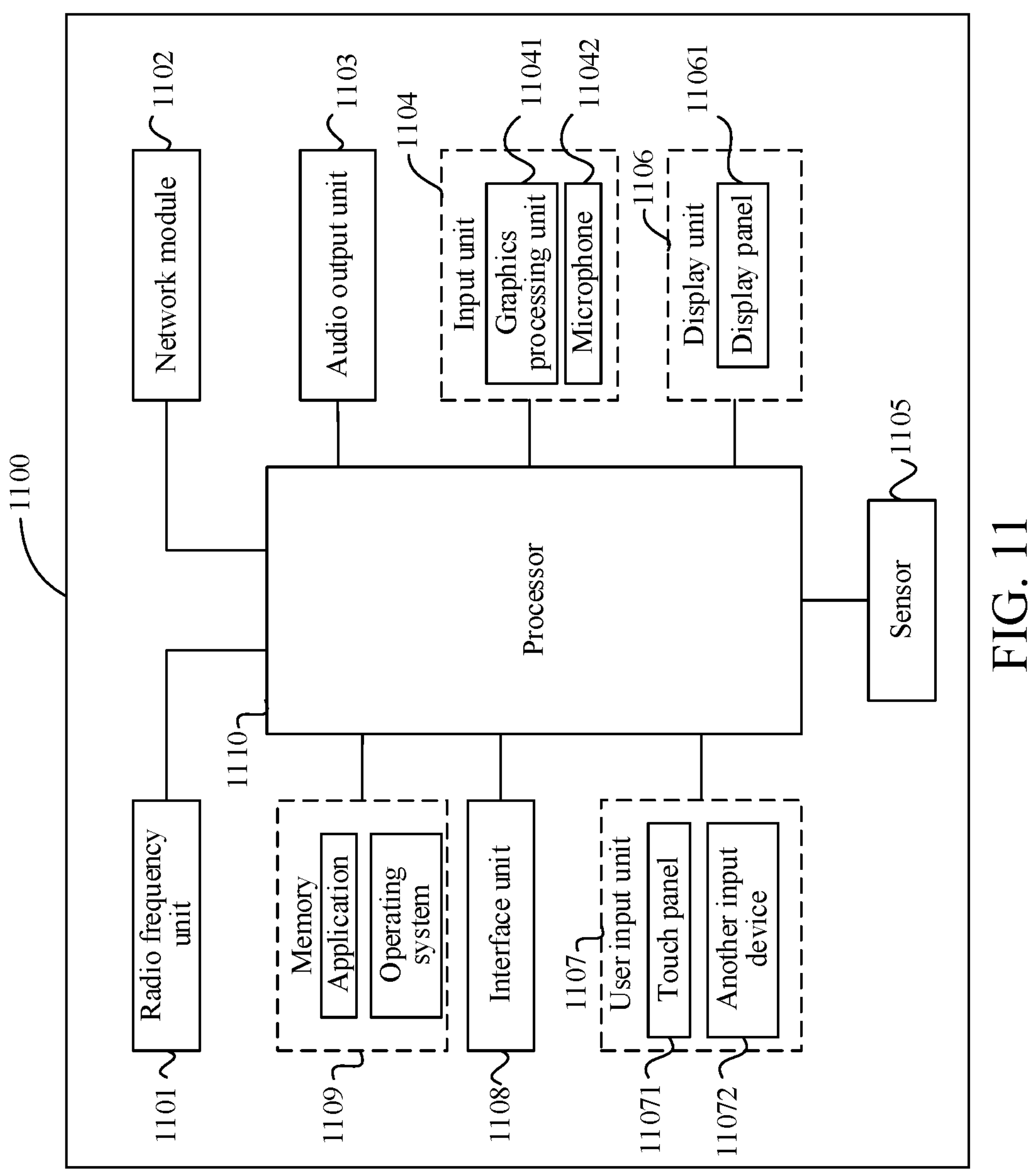
FIG. 11 is a structural block diagram of a terminal according to an embodiment of this application.

The terminal embodiment corresponds to the foregoing terminal side method embodiment. The processes and implementations of the foregoing method embodiments are applicable in the terminal embodiment, and a same technical effect can be achieved. FIG. 11 is a schematic structural diagram of hardware of a terminal that implements an embodiment of this application. The terminal 1100 includes, but is not limited to: at least some components of a radio frequency unit 1101, a network module 1102, an audio output unit 1103, an input unit 1104, a sensor 1105, a display unit 1106, a user input unit 1107, an interface unit 1108, a memory 1109, a processor 1110, and the like.

A person skilled in the art can understand that the terminal 1100 may further include a power supply (such as a battery) for supplying power to the components. The power supply may be logically connected to the processor 1110 by a power management system, thereby implementing functions such as charging, discharging, and power consumption management by using the power management system. A terminal structure shown in FIG. 11 constitutes no limitation on the terminal, and the terminal may include more or fewer components than those shown in the figure, or some components may be combined, or a different component deployment may be used. Details are not described herein again.

It should be understood that in this embodiment of this application, the input unit 1104 may include a Graphics Processing Unit (GPU) 11041 and a microphone 11042. The graphics processing unit 11041 performs processing on image data of a static picture or a video that is obtained by an image acquisition device (for example, a camera) in a video acquisition mode or an image acquisition mode. The display unit 1106 may include a display panel 11061. The display panel 11061 may be configured in a form of a liquid crystal display, an organic light-emitting diode, or the like. The user input unit 1107 includes a touch panel 11071 and another input device 11072. The touch panel 11071 is also referred to as a touch screen. The touch panel 11071 may include two parts: a touch detection apparatus and a touch controller. The another input device 11072 may include, but is not limited to, a physical keyboard, a functional key (such as a volume control key or a switch key), a track ball, a mouse, and a joystick, which are not described herein in detail.

In this embodiment of this application, the radio frequency unit 1101 receives downlink data from a network side device, and sends to the processor 1110 for processing; and sends uplink data to the network side device. Generally, the radio frequency unit 1101 includes, but is not limited to, an antenna, at least one amplifier, a transceiver, a coupler, a low noise amplifier, a duplexer, and the like.

The memory 1109 may be configured to store a software program or instructions and various data. The memory 1109 may mainly include a program or instructions storage area and a data storage area. The program or instructions storage area may store an operating system, an application program or instructions required by at least one function (for example, a sound playback function and an image display function), and the like. In addition, the memory 1109 may include a high-speed random access memory, and may also include a non-volatile memory. The non-volatile memory may be a read-only memory (ROM), a programmable ROM (PROM), an erasable PROM (EPROM), an electrically EPROM (EEPROM), or a flash memory, for example, at least one magnetic disk storage device, a flash memory, or another volatile solid-state storage device.

The processor 1110 may include one or more processing units. In some embodiments, the processor 1110 may integrate an application processor and a modem processor, where the application processor mainly processes an operating system, a user interface, an application program or instructions, and the like, and the modem processor mainly processes wireless communication, for example, a baseband processor. It can be understood that, the modem processor may not be integrated in the processor 1110.

The processor 1110 is configured to monitor paging in a first monitoring manner if the terminal is in a radio resource control RRC inactive state, where The first monitoring manner includes at least one of the following:

- monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;
- determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;
- monitoring radio access network paging and core network paging on a fourth paging monitoring occasion, where the fourth paging monitoring occasion is determined by the core network device based on the minimum value in the first DRX cycle, the second DRX cycle, and the third DRX cycle; or
- monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network, the second DRX cycle is a paging DRX cycle configured by a core network, and the third DRX cycle is a default DRX cycle broadcast in system information.

In some embodiments, the radio frequency unit 1101 is configured to receive indication information, before the processor 1110 monitors radio access network paging on the first paging monitoring occasion and monitors core network paging on the second paging monitoring occasion, or monitors radio access network paging and core network paging on the third paging monitoring occasion, where the indication information indicates that the network supports or allows the terminal to move the paging monitoring occasion.

In some embodiments, the processor 1110 is configured to determine the third paging monitoring occasion based on the following formula:

$$i\_s=\text{floor}(UE\_ID/N1) \bmod Ns, \text{ where}$$

i_s represents an index of the third paging monitoring occasion, N1 represents a total number of paging frames in the first paging cycle, Ns represents a number of paging occasions in a paging frame, and UE_ID represents a terminal identity related to a terminal identifier.

In some embodiments, the radio frequency unit 1101 is configured to report first information, before the processor 1110 monitors radio access network paging and core network paging on the fourth paging monitoring occasion or the fifth paging monitoring occasion, where the first information indicates that the first paging monitoring occasion does not completely overlap with the second paging monitoring occasion.

In some embodiments, the radio frequency unit 1101 is configured to obtain, before the processor 1110 module monitors radio access network paging and core network paging on the fourth paging monitoring occasion or the fifth paging monitoring occasion, a target paging monitoring occasion through broadcast indication information or dedicated signaling indication information, where the target paging monitoring occasion is the fourth paging monitoring occasion or the fifth paging monitoring occasion.

In some embodiments, the radio frequency unit 1101 is configured to send second indication information to the core network device, where the second indication information indicates that the terminal supports monitoring paging in the first monitoring manner in the radio resource control RRC inactive state.

The terminal in this embodiment of this application, the terminal in the RRC inactive state, monitors paging in the first monitoring manner, for example, monitors radio access network paging on the first paging monitoring occasion and core network paging on the second paging monitoring occasion; or monitors radio access network paging and core network paging on the third paging monitoring occasion, the fourth paging monitoring occasion, or the fifth paging monitoring occasion. In this way, it can be ensured that the terminal in the RRC inactive state can monitor both radio access network paging and the core network paging.

It should be noted that, the paging processing method provided in this embodiment of this application may be performed by a paging processing apparatus, or a control module for performing the paging processing method in the paging processing apparatus. An example in which a paging processing apparatus performs the paging processing method is used in this embodiment of this application to describe the paging processing apparatus provided in this embodiment of this application.

Figures 12, 13:
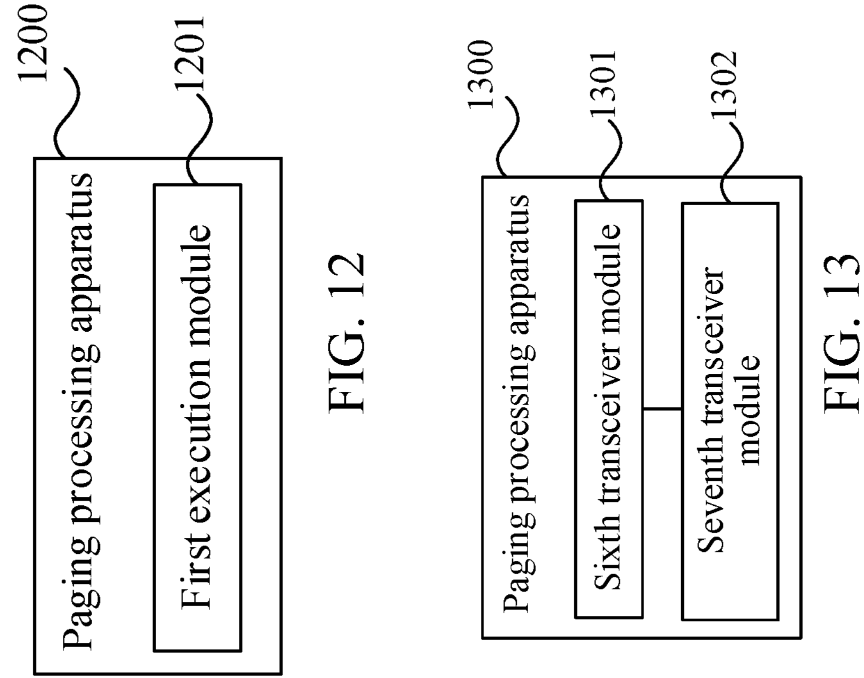
FIG. 12 is a schematic diagram 1 of modules of a paging processing apparatus according to an embodiment of this application.
FIG. 13 is a schematic diagram 2 of modules of a paging processing apparatus according to an embodiment of this application.

As shown in FIG. 12, an embodiment of this application further provides a paging processing apparatus 1200, including:

- a first execution module 1201, configured to determine a fifth paging monitoring occasion based on a minimum value in a second DRX cycle and a third DRX cycle, where the fifth paging monitoring occasion is a monitoring occasion on which a terminal in an RRC inactive state monitors radio access network paging and core network paging, where the second DRX cycle is a paging DRX cycle configured by a core network, and the third DRX cycle is a default DRX cycle broadcast in system information.

In some embodiments, the first execution module 1201 is configured to receive second indication information from a core network device, the second indication information indicates that the terminal supports monitoring paging in a first monitoring manner in the radio resource control RRC inactive state, and the first monitoring manner includes monitoring radio access network paging and core network paging on the fifth paging monitoring occasion.

In some embodiments, the first execution module 1201 is configured to determine the fifth paging monitoring occasion based on the minimum value in the second DRX cycle and the third DRX cycle if a first paging monitoring occasion does not completely overlap with a second paging monitoring occasion in a discontinuous DRX cycle, where the first paging monitoring occasion is a monitoring occasion determined based on a minimum value in a first DRX cycle, the second DRX cycle, and the third DRX cycle, the second paging monitoring occasion is a monitoring occasion determined based on the minimum in the second DRX cycle and the third DRX cycle, and the first DRX cycle is a paging DRX cycle configured by a radio access network.

The apparatus in this embodiment of this application further includes:

a third determining module, configured to determine whether the first paging monitoring occasion does not completely overlap with the second paging monitoring occasion.

In some embodiments, the first execution module is configured to determine the fifth paging monitoring occasion based on the minimum value in the second DRX cycle and the third DRX cycle is first information is received, where the first information indicates that the first paging monitoring occasion does not completely overlap with the second paging monitoring occasion.

The apparatus in this embodiment of this application further includes:

a third transceiver module, configured to send the first information to the core network device.

The apparatus in this embodiment of this application further includes:

a fourth transceiver module, configured to send the first DRX cycle the core network device.

The apparatus in this embodiment of this application further includes:

a first indication module, configured to indicate the fifth paging monitoring occasion to the terminal.

In some embodiments, the first indication module is configured to indicate the fifth paging monitoring occasion to the terminal through broadcast indication information or dedicated signaling indication information.

In some embodiments, the radio access network device is a source base station. The apparatus in this embodiment of this application further includes:

a fifth transceiver module, configured to second indication information to a target base station to which the terminal performs cell handover, where the second indication information indicates that the terminal supports monitoring paging in the first monitoring manner in the radio resource control RRC inactive state.

The apparatus in this embodiment of this application determines the fifth paging monitoring occasion based on the minimum value in the second DRX cycle and the third DRX cycle. Because the core network device originally determines the paging monitoring occasion corresponding to core network paging based on the minimum value in the second DRX cycle and the third DRX cycle, it can be ensured that the paging monitoring occasion corresponding to core network paging overlaps with the paging monitoring occasion corresponding to the RAN, thereby further ensuring that the terminal can monitor both radio access network paging and core network paging on the fifth paging monitoring occasion.

The apparatus in this embodiment of this application can implement all processes implemented in the method embodiment in FIG. 3 and has a same technical effect. To avoid repetition, details are not described herein again.

As shown in FIG. 13, an embodiment of this application further provides a paging processing apparatus 1300, including:

a sixth transceiver module 1301, configured to receive second indication information from a terminal, where the second indication information indicates that the terminal monitors paging in a first monitoring manner in a radio resource control RRC inactive state; and a seventh transceiver module 1302, configured to send the second indication information to a radio access network device.

The first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network, the second DRX cycle is a paging DRX cycle configured by a core network, and the third DRX cycle is a default DRX cycle broadcast in system information.

In the apparatus in this embodiment of this application, the core network device receives the second indication information sent by the terminal and sends the second indication information to the radio access network device, to notify the radio access network device that the terminal supports monitoring paging in the first monitoring manner in the radio resource control RRC inactive state.

The apparatus in this embodiment of this application can implement all processes implemented in the method embodiment in FIG. 4 and has a same technical effect. To avoid repetition, details are not described herein again.

An embodiment of this application further provides a network side device. The network side device may be a radio access network device or a core network device. The network side device includes a processor and a communication interface. When the network side device is the radio access network device, the processor is configured to determine a fifth paging monitoring occasion based on a minimum value in a second DRX cycle and a third DRX cycle, where the fifth paging monitoring occasion is a monitoring occasion on which a terminal in an RRC inactive state monitors radio access network paging and core network paging.

The second DRX cycle is a paging DRX cycle configured by a core network, and the third DRX cycle is a default DRX cycle broadcast in system information.

The network side device embodiment corresponds to the foregoing terminal-side method embodiments. The processes and implementations of the foregoing method embodiments are applicable in the network side device embodiment, and a same technical effect can be achieved.

When the network side device is the core network device, the processor is configured to receive second indication information from the terminal, where the second indication information indicates that the terminal supports monitoring paging in the first monitoring manner in the radio resource control RRC inactive state; and send the second indication information to a radio access network device.

The first monitoring manner includes at least one of the following:

monitoring radio access network paging on a first paging monitoring occasion, and monitoring core network paging on a second paging monitoring occasion, where the first paging monitoring occasion is a monitoring occasion determined by the terminal based on a minimum value in a first DRX cycle, a second DRX cycle, and a third DRX cycle, and the second paging monitoring occasion is a monitoring occasion determined by the terminal based on a minimum value in the second DRX cycle and the third DRX cycle;

determining a third paging monitoring occasion, and monitoring radio access network paging and core network paging on the third paging monitoring occasion, where the third paging monitoring occasion is a monitoring occasion determined by the terminal based on a first paging cycle, the first paging cycle is a minimum value in the second DRX cycle and the third DRX cycle, or the third paging monitoring occasion is obtained by the terminal by adjusting a position of the first paging monitoring occasion in a preset adjustment manner and is obtained based on the adjusted first paging monitoring occasion, and the preset adjustment manner is adjusting the position of the first paging monitoring occasion to enable the first paging monitoring occasion to overlap with the second paging monitoring occasion;

monitoring radio access network paging and core network paging on a fourth paging monitoring occasion, where the fourth paging monitoring occasion is determined by the core network device based on the minimum value in the first DRX cycle, the second DRX cycle, and the third DRX cycle; or monitoring radio access network paging and core network paging on a fifth paging monitoring occasion, where the fifth paging monitoring occasion is determined by the radio access network device based on the minimum value in the second DRX cycle and the third DRX cycle.

The first DRX cycle is a paging DRX cycle configured by a radio access network, the second DRX cycle is a paging DRX cycle configured by a core network, and the third DRX cycle is a default DRX cycle broadcast in system information.

The network side device embodiment corresponds to the foregoing terminal-side method embodiments. The processes and implementations of the foregoing method embodiments are applicable in the network side device embodiment, and a same technical effect can be achieved.

Figure 14:
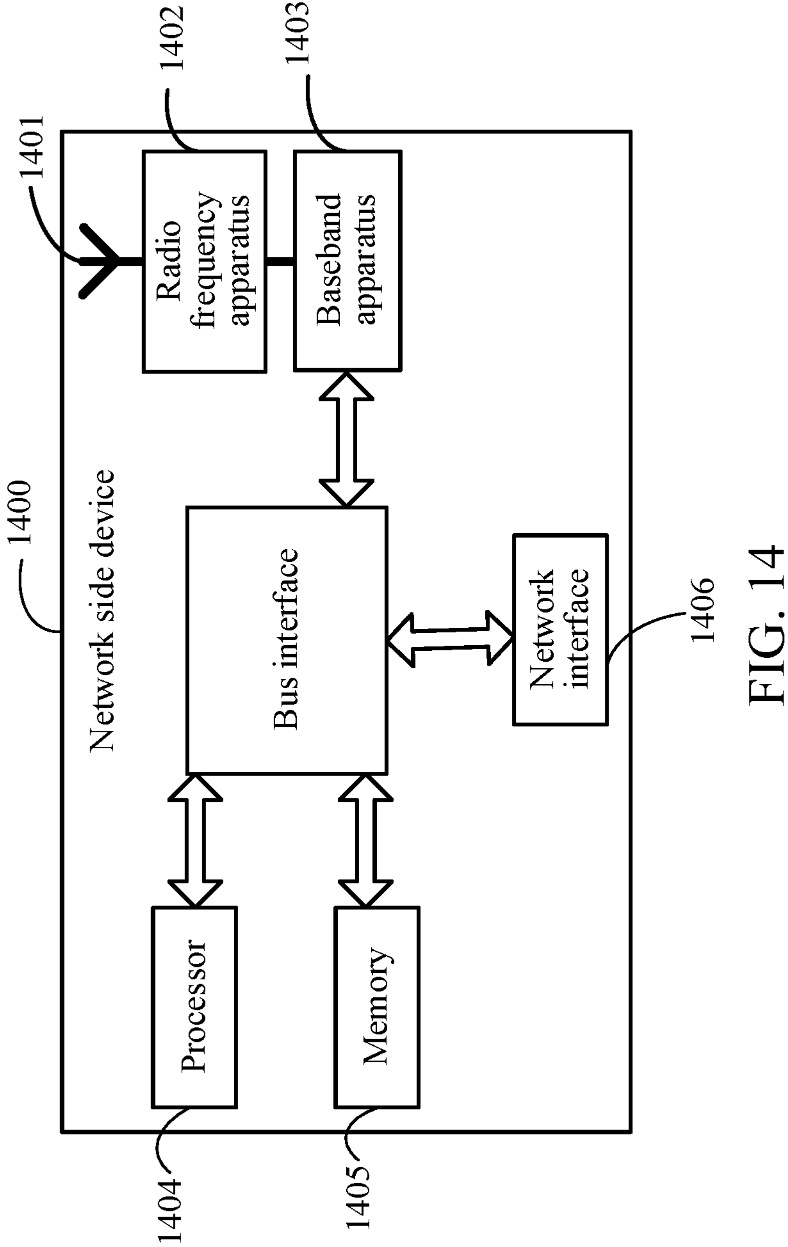
FIG. 14 is a structural block diagram 1 of a network side device according to an embodiment of this application.

An embodiment of this application further provides a network side device. The network side device may be a radio access network device, as shown in FIG. 14, the network side device 1400 includes: an antenna 1401, a radio frequency apparatus 1402, and a baseband apparatus 1403. The antenna 1401 is connected to the radio frequency apparatus 1402. In an uplink direction, the radio frequency apparatus 1402 receives information through the antenna 1401, and sends the received information to the baseband apparatus 1403 for processing. In a downlink direction, the baseband apparatus 1403 processes to-be-sent information, and sends the information to the radio frequency 1402, and the radio frequency 1402 processes the received information and sends the processed information through the antenna 1401.

The frequency band processing apparatus may be located in the baseband apparatus 1403. The method performed by the network side device in the foregoing embodiment may be implemented in the baseband apparatus 1403. The baseband apparatus 1403 includes a processor 1404 and a memory 1405.

For example, the baseband 1403 may include at least one baseband board. A plurality of chips are disposed on the baseband board, as shown in FIG. 14. For example, one of the chips may be the processor 1404, connected to the memory 1405, to call a program in the memory 1405 and implement the operations of the radio access network device side in the foregoing method embodiment.

The baseband apparatus 1403 may further include a network interface 1406, configured to exchange information with the radio frequency apparatus 1402. For example, the interface may be a common public radio interface (CPRI).

The network side device (radio access network device) in this embodiment of this application further includes: instructions or a program stored in the memory 1405 and executable on the processor 1404. The processor 1404 calls the instructions or program in the memory 1405 to perform the method performed by the modules shown in FIG. 12, and achieves a same technical effect. To avoid repetition, details are not described herein again.

Figure 15:
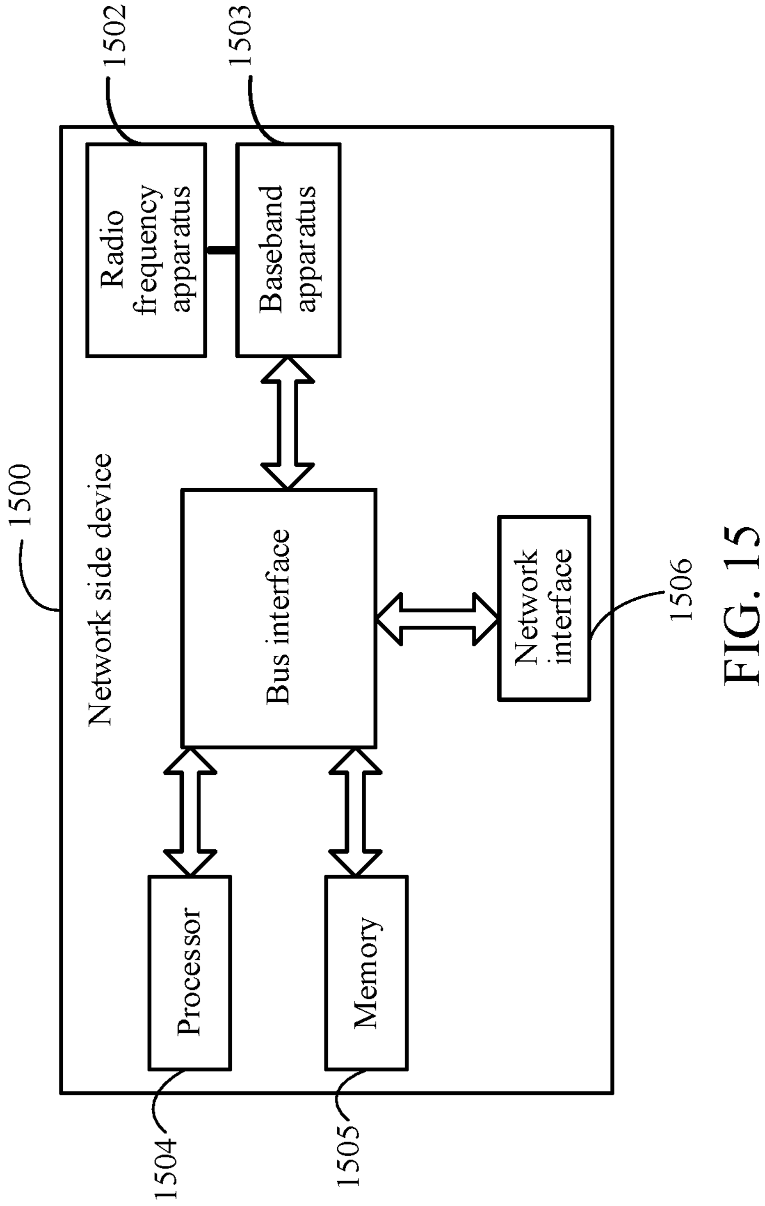
FIG. 15 is a structural block diagram 2 of a network side device according to an embodiment of this application.

An embodiment of this application further provides a network side device. The network side device may be a core network device. As shown in FIG. 15, the network side device includes a baseband apparatus 1503. The baseband apparatus 1503 processes to-be-sent information.

The frequency band processing apparatus may be located in the baseband apparatus 1503. The method performed by the network side device in the foregoing embodiment may be implemented in the baseband apparatus 1503. The baseband apparatus 1503 includes a processor 1504 and a memory 1505.

For example, the baseband 1503 may include at least one baseband board. A plurality of chips are disposed on the baseband board, as shown in FIG. 15. For example, one of the chips may be the processor 1504, connected to the memory 1505, to call a program in the memory 1505 and implement the operations of the core network device side in the foregoing method embodiment.

The baseband apparatus 1503 may further include a network interface 1506, configured to exchange information with the radio frequency apparatus 1502. For example, the interface may be a common public radio interface (CPRI).

The network side device (core network device) in this embodiment of this application further includes: instructions or a program stored in the memory 1505 and executable on the processor 1504. The processor 1504 calls the instructions or program in the memory 1505 to perform the method performed by the modules shown in FIG. 13, and achieves a same technical effect. To avoid repetition, details are not described herein again.

An embodiment of this application further provides a readable storage medium. The readable storage medium stores a program or instructions. The program or instructions, when executed by a processor, implement the processes of the foregoing paging detection method embodiments or paging processing method embodiments, and can achieve a same technical effect. To avoid repetition, details are not described herein again.

The processor is the processor in the terminal in the foregoing embodiment. The readable storage medium includes a computer-readable storage medium, such as a computer read-only memory (ROM), a random access memory (RAM), a magnetic disk, or a disc.

An embodiment of this application further provides a computer program product. The computer program product is stored in a non-transitory storage medium. The computer program product is executed by at least one processor, to implement processes of the foregoing paging detection method embodiments or paging processing method embodiments, and can achieve a same technical effect. To avoid repetition, details are not described herein again.

An embodiment of this application further provides a chip. The chip includes a processor and a communication interface. The communication interface is coupled to the processor. The processor is configured to run a program or instructions, to implement processes of the foregoing paging detection method embodiments or paging processing method embodiments, and can achieve a same technical effect. To avoid repetition, details are not described herein again.

It should be understood that the chip provided in this embodiment of this application may also be referred to as a system-level chip, a system chip, a system on a chip, or the like.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that, the scope of the methods and apparatus in the embodiments of this application is not limited to performing functions in the order shown or discussed, and may also include performing functions in a substantially simultaneous manner or in reverse order according to the functions involved. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the methods in the foregoing embodiments may be implemented by using software and a necessary general hardware platform, and may also be implemented by hardware, but in many cases, the former manner is a better implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc) and includes several instructions for enabling a terminal (which may be a mobile phone, a computer, a server, a network device, or the like) to perform the methods described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in this application make many forms without departing from the idea of this application and the scope of protection of the claims. All of the forms fall within the protection of this application.

What is claimed is:

1. A method of paging detection, comprising:

receiving, by a terminal, first indication information, wherein the first indication information indicates monitoring paging in a first monitoring manner; and in response to the first indication information, monitoring, by the terminal, paging in the first monitoring manner when the terminal is in a radio resource control (RRC) inactive state, wherein the first monitoring manner comprises:

determining a third paging monitoring occasion, and monitoring radio access network paging and core network paging on the third paging monitoring occasion, wherein the third paging monitoring occasion is a monitoring occasion determined by the terminal based on a first paging cycle, the first paging cycle is a minimum value in a second DRX cycle and a third DRX cycle, wherein the third paging monitoring occasion is determined based on the following formula:

$$i\_s = \text{floor}(UE\_ID/N1) \bmod Ns,$$

where i_s represents an index of the third paging monitoring occasion, N1 represents a total number of paging frames in the first paging cycle and is determined by the minimum value in the second DRX cycle and the third DRX cycle, Ns represents a number of paging occasions in a paging frame, and UE_ID represents a terminal identity related to a terminal identifier, and wherein the second DRX cycle is a paging DRX cycle configured by a core network, and the third DRX cycle is a default DRX cycle broadcast in system information.

2. The method according to claim 1, further comprising:

sending, by the terminal, second indication information to the core network device, wherein the second indication information indicates that the terminal supports monitoring paging in the first monitoring manner in the radio resource control (RRC) inactive state.

3. A terminal, comprising: a memory storing a computer program; and a processor coupled to the memory and configured to execute the computer program to perform operations comprising:

receiving first indication information, wherein the first indication information indicates monitoring paging in a first monitoring manner; and monitoring paging in the first monitoring manner when the terminal is in a radio resource control (RRC) inactive state, wherein the first monitoring manner comprises:

determining a third paging monitoring occasion, and monitoring radio access network paging and core network paging on the third paging monitoring occasion, wherein the third paging monitoring occasion is a monitoring occasion determined by the terminal based on a first paging cycle, the first paging cycle is a minimum value in a second DRX cycle and a third DRX cycle, wherein the third paging monitoring occasion is determined based on the following formula:

$$i\_s = \text{floor}(\text{UE\_ID}/N1) \bmod Ns,$$

where i_s represents an index of the third paging monitoring occasion, N1 represents a total number of paging frames in the first paging cycle and is determined by the minimum value in the second DRX cycle and the third DRX cycle, Ns represents a number of paging occasions in a paging frame, and UE_ID represents a terminal identity related to a terminal identifier, and wherein the second DRX cycle is a paging DRX cycle configured by a core network, and the third DRX cycle is a default DRX cycle broadcast in system information.

4. The terminal according to claim 3, wherein the operations further comprise:

sending second indication information to the core network device, wherein the second indication information indicates that the terminal supports monitoring paging in the first monitoring manner in the radio resource control (RRC) inactive state.

5. A non-transitory computer-readable storage medium, storing a computer program, wherein the computer program, when executed by a processor of a terminal, causes the processor to perform operations comprising:

receiving first indication information, wherein the first indication information indicates monitoring paging in a first monitoring manner; and monitoring paging in the first monitoring manner when the terminal is in a radio resource control (RRC) inactive state, wherein the first monitoring manner comprises:

determining a third paging monitoring occasion, and monitoring radio access network paging and core network paging on the third paging monitoring occasion, wherein the third paging monitoring occasion is a monitoring occasion determined by the terminal based on a first paging cycle, the first paging cycle is a minimum value in a second DRX cycle and a third DRX cycle, wherein the third paging monitoring occasion is determined based on the following formula:

$$i\_s = \text{floor}(\text{UE\_ID}/N1) \bmod Ns,$$

where i_s represents an index of the third paging monitoring occasion, N1 represents a total number of paging frames in the first paging cycle and is determined by the minimum value in the second DRX cycle and the third DRX cycle, Ns represents a number of paging occasions in a paging frame, and UE_ID represents a terminal identity related to a terminal identifier, and wherein the second DRX cycle is a paging DRX cycle configured by a core network, and the third DRX cycle is a default DRX cycle broadcast in system information.

6. The non-transitory computer-readable storage medium according to claim 5, wherein the operations further comprise:

sending second indication information to the core network device, wherein the second indication information indicates that the terminal supports monitoring paging in the first monitoring manner in the radio resource control (RRC) inactive state.

* * * * *